(12) United States Patent
Zhang

(10) Patent No.: US 7,126,922 B2
(45) Date of Patent: *Oct. 24, 2006

(54) DYNAMIC RADIO LINK ADAPTATION FOR INTERFERENCE IN CELLULAR SYSTEMS

(75) Inventor: Guodong Zhang, Farmingdale, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/141,215

(22) Filed: May 31, 2005

(65) Prior Publication Data

US 2005/0233761 A1    Oct. 20, 2005

Related U.S. Application Data

(63) Continuation of application No. 10/322,161, filed on Dec. 18, 2002, now Pat. No. 6,907,010.

(60) Provisional application No. 60/418,386, filed on Oct. 11, 2002.

(51) Int. Cl.
| | |
|---|---|
| H01L 12/26 | (2006.01) |
| H01L 12/28 | (2006.01) |
| H01L 12/16 | (2006.01) |
| H04J 3/16 | (2006.01) |
| G01R 31/08 | (2006.01) |
| G06F 11/00 | (2006.01) |
| G08C 15/00 | (2006.01) |
| H04B 1/00 | (2006.01) |
| H04B 1/10 | (2006.01) |
| H04B 15/00 | (2006.01) |
| H04B 17/00 | (2006.01) |

(52) U.S. Cl. ............... 370/252; 370/437; 455/62; 455/63.1; 455/67.11

(58) Field of Classification Search ............... 370/252, 370/232, 437, 279, 329, 427, 389, 335, 280, 370/294, 336, 318, 332; 455/450, 509, 552, 455/561, 466, 62, 63.1, 67.11
See application file for complete search history.

(56) References Cited

U.S. PATENT DOCUMENTS

| | | | |
|---|---|---|---|
| 6,392,572 B1 | 5/2002 | Shiu et al. | |
| 6,510,137 B1 * | 1/2003 | Belaiche | 370/232 |
| 6,510,146 B1 | 1/2003 | Korpela et al. | |
| 6,564,067 B1 | 5/2003 | Agin | |
| 6,622,024 B1 | 9/2003 | Koo et al. | |
| 6,640,105 B1 | 10/2003 | Shin | |
| 6,661,777 B1 | 12/2003 | Blanc et al. | |
| 6,671,514 B1 | 12/2003 | Cedervall et al. | |
| 6,675,016 B1 | 1/2004 | Lucidarme et al. | |
| 6,725,039 B1 | 4/2004 | Parmar et al. | |
| 6,747,958 B1 | 6/2004 | Vayanos et al. | |
| 2002/0037749 A1 * | 3/2002 | Wager | 455/561 |
| 2004/0266461 A1 * | 12/2004 | Beckmann et al. | 455/466 |

* cited by examiner

*Primary Examiner*—Chi Pham
*Assistant Examiner*—Prenell Jones
(74) *Attorney, Agent, or Firm*—Volpe and Koenig, P.C.

(57) ABSTRACT

A method for implementing dynamic link adaptation in a cellular system by a user equipment (UE) having two coded composite transport channels (CCTrCHs) in an uplink time slot begins by estimating transmit power using a transport format combination (TFC) pair for the CCTrCHs. The total estimated transmit power for the two CCTrCHs is compared with a given threshold. Use of both TFCs is permitted when the total estimated power is less than the threshold.

20 Claims, 1 Drawing Sheet

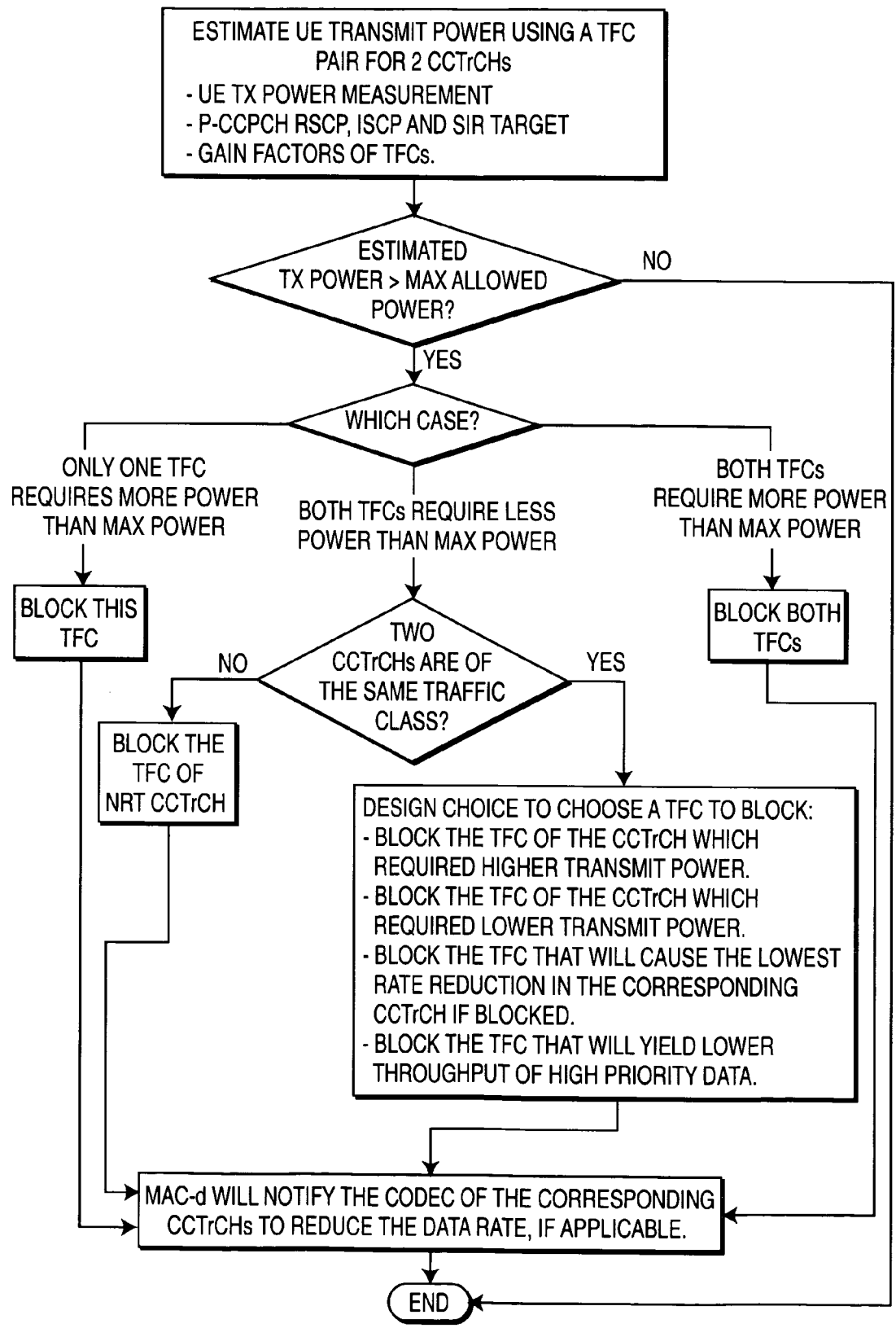

DYNAMIC RADIO LINK ADAPTATION FOR INTERFERENCE IN CELLULAR SYSTEMS

CROSS REFERENCE TO RELATED APPLICATIONS

This application is a continuation of U.S. patent application Ser. No. 10/322,161, filed Dec. 18, 2002, now U.S. Pat. No. 6,907,010, which claims the benefit of U.S. Provisional Application No. 60/418,386 filed on Oct. 11, 2002, which is incorporated by reference as if fully set forth herein.

FIELD OF INVENTION

This invention generally relates transport format combination (TFC) selection, and more particularly to a technique enabling a user equipment (UE) to make a TFC selection employing dynamic link adaptation (DLA).

BACKGROUND

The following acronyms are used in this application:

| | |
|---|---|
| CCPCH | common control physical channel |
| CCTrCH | coded composite transport channel |
| ISCP | interference signal code power |
| MAC | medium access control |
| NRT | non-real time |
| RSCP | received signal control power |
| RT | real time |
| SIR | signal to interference ratio |
| TDD | time-division duplex |
| TFC | transport format combination |
| TX | transmission |
| UE | user equipment |
| UMTS | universal mobile telecommunications system |

For UMTS-TDD systems, in an uplink time slot where the UE has only one CCTrCH, the UE TX power is the TX power of the CCTrCH, which is determined by the TFC used for this CCTrCH. As specified in the standards, when the UE estimates that a certain TFC would require more power than the maximum transmitter power, it should limit the usage of that TFC. The UE continuously evaluates which TFCs can be used for the purpose of TFC selection. The evaluation is performed using the estimated UE transmit power of a given TFC. MAC-d will notify the codec to reduce the data rate, if applicable, by sharing the information as to which TFCs can be used. This is called dynamic link adaptation (DLA).

However, in an uplink time slot where the UE has two CCTrCHs, the UE TX power is the sum of the TX power of the two CCTrCHs. That is, UE TX power is determined jointly by the TFCs of the two CCTrCHs. The current standardized dynamic link adaptation (DLA) algorithm cannot deal with this case, i.e., the UE does not know which TFCs to use or block.

It is desirable to provide a method of enabling a UE to make a decision regarding TFC selection by using dynamic link adaptation (DLA).

SUMMARY

The invention provides a method of dynamic radio link adaptation in the presence of variable interference conditions in cellular systems. The invention offers a solution to perform dynamic link adaptation properly when the UE has two CCTrCHs in an uplink time slot. The invention also provides details of the preferred implementation, and strategies and algorithms by which cellular networks can dynamically adapt a radio link according to the change of interference. In particular, it is applicable to UMTS-TDD systems. It is to be noted that this invention is applicable to UMTS-FDD, CDMA-2000 and other systems as well.

A method for implementing dynamic link adaptation in a cellular system by a user equipment (UE) having two coded composite transport channels (CCTrCHs) in an uplink time slot begins by estimating transmit power using a transport format combination (TFC) pair for the CCTrCHs. The total estimated transmit power for the two CCTrCHs is compared with a given threshold. Use of both TFCs is permitted when the total estimated power is less than the threshold.

A dynamic link adaptation apparatus for use in a cellular system by a UE having two CCTrCHs in an uplink time slot includes estimating means for estimating transmit power using a TFC pair for the CCTrCHs, comparing means for comparing total estimated transmit power for the two CCTrCHs with a given threshold, and means for permitting use of both TFCs when the total estimated power is less than the threshold.

BRIEF DESCRIPTION OF THE DRAWING

A more detailed understanding of the invention may be had from the following description of a preferred embodiment, given by way of example and to be understood in conjunction with the accompanying drawing wherein:

FIGURE 1 is a flow diagram of the process steps for a preferred embodiment of the present invention.

DETAILED DESCRIPTION OF THE PREFERRED EMBODIMENT

An implementation of an exemplary interpolator algorithm for dynamic link adaptation for CDMA cellular systems is set forth below. The exemplary dynamic link adaptation algorithm takes into account that the UE has two CCTrCHs in an uplink time slot, and includes the following:

1) The combination of a TFC used by the first CCTrCH and a TFC used by the second CCTrCH is defined as the TFC pair of the UE that has two CCTrCHs in one time slot. When the UE (physical layer) estimates that a certain TFC pair would require more power than the maximum transmitter power, the usage of that TFC pair is limited.

2) The UE will decide as to which TFCs can be used for each CCTrCH based on the following:
   a. The traffic class (RT or NRT) of the CCTrCH,
   b. The required transmit power for a TFC of a CCTrCH,
   c. Physical resource allocation information, and
   d. Priority of the logical channel.

The following is an example of the interpolator algorithm. A UE transmit power estimation will be made using the result of uplink power control (either the UE transmitted power measured over the last measurement period or the new TX power based on updated P-CCPCH RSCP, ISCP or SIR target) and the gain factors of the corresponding TFC.

When the UE estimates that a certain TFC pair would require more power than the maximum transmitter power, it will check the required transmit power of each TFC of the corresponding CCTrCH in the TFC pair. The UE will process the TFC pair depending on the transmit power and traffic class.

If only the TFC of one CCTrCH requires more power than the maximum transmitter power, then this TFC will be blocked.

If the TFCs of both CCTrCHs require more power than the maximum transmitter power, then both TFCs will be blocked.

If TFCs of both CCTrCHs require less power than the maximum transmitter power but the sum of them requires more than the maximum transmitter power, the UE will choose to block one TFC based on traffic class.

If one CCTrCH is real-time (RT) and the other CCTrCH is non-real-time (NRT), the UE will block the TFC of NRT CCTrCH.

If both CCTrCHs are RT or NRT, the UE can choose to block a TFC based on the transmit power required by the TFC or physical resource allocation information. It is a design choice. The design choice includes the following alternatives:

Block the TFC of the CCTrCH requiring higher transmit power.

Block the TFC of the CCTrCH requiring lower transmit power.

Block the TFC that will cause the lowest rate reduction in the corresponding CCTrCH if blocked. This is determined by knowing the physical resource allocation of the CCTrCHs.

Block the TFC that will yield lower throughput of high priority data.

MAC-d will notify the codec of the corresponding CCTrCH(s) to reduce the data rate, if applicable, by sharing the information as to which TFCs can be used for each CCTrCH.

FIGURE 1 illustrates the steps described above for a preferred embodiment of the process of the invention, and starts at the step of "estimating UE transmit power using a TFC pair for two CCTrCHs". After stringing through the intermediate steps shown, the process of the algorithm ends in "MAC-d notifying the codec of the corresponding CCTrCHs to reduce the data rate, if applicable".

While the foregoing description makes reference to UMTS-TDD systems as an example, it is to be noted that the invention is applicable to FDD and other systems as well. Modifications, which would be needed to render the inventive method suitable for UMTS-FDD, CDMA-2000, and other systems, are considered to be within the purview of the present invention.

What is claimed is:

1. A method for implementing dynamic link adaptation in a cellular system by a user equipment (UE) having two coded composite transport channels (CCTrCHs) in an uplink time slot, the method comprising the steps of:
   estimating transmit power using a transport format combination (TFC) pair for the CCTrCHs;
   comparing total estimated transmit power for two CCTrCHs with a given threshold; and
   permitting use of both TFCs when the total estimated power is less than the threshold.

2. The method according to claim 1, further comprising the steps of:
   comparing a power of each TFC with the threshold; and
   blocking both TFCs when each TFC requires more power than the threshold.

3. The method according to claim 1, further comprising the steps of:
   comparing a power of each TFC with the threshold; and
   blocking the TFC whose estimated power is greater than the threshold.

4. A dynamic link adaptation apparatus far use in a cellular system by a user equipment (UE) having two coded composite transport channels (CCTrCHs) in an uplink time slot, comprising:
   estimating means for estimating transmit power using a transport format combination (TFC) pair for the CCTrCHs;
   comparing means for comparing total estimated transmit power for two CCTrCRs with a given threshold; and
   means for permitting use of both TFCs when the total estimated power is less than said threshold.

5. The apparatus according to claim 4, further comprising:
   second comparing means for comparing a power of each TFC with said threshold; and
   blocking means for blocking both TFCs when each TFC requires more power than said threshold.

6. The apparatus according to claim 4, further comprising:
   second comparing means for comparing a power of each TFC with said threshold; and
   blocking means for blocking the TFC whose estimated power is greater than said threshold.

7. A user equipment (UE) for dynamically selecting a transport format combination (TFC) for simultaneous transmission of a plurality of coded composite transport channels (CCTrCHs), the UE comprising:
   a power estimation unit for estimating transmit power of a TFC for each CCTrCH;
   a comparator for determining whether a total transmit power estimate for transmitting the CCTrCHs exceeds a maximum allowed transmit power of the UE; and
   a TFC selection unit for blocking at least one TFC if the total transmit power estimate exceeds the maximum allowed transmit power.

8. The UE of claim 7 wherein the TFC selection unit blocks each TFC requiring a transmit power more than the maximum allowed transmit power.

9. The UE of claim 7 further comprising a means for determining a traffic class of each CCTrCH, whereby the TFC selection unit blocks a TFC of a CCTrCH for non-real time (NRT) traffic before blocking a TFC of a CCTrCH for real time (RT) traffic.

10. The UE of claim 9 wherein the TFC selection unit blocks a TFC requiring a higher transmit power before blocking a TFC requiring a lower transmit power.

11. The UE of claim 9 wherein the TFC selection unit blocks a TFC causing a lower rate reduction before blocking a TFC causing a higher rate reduction in a respective CCTrCH.

12. The UE of claim 10 wherein the TFC selection unit blocks a TFC yielding a lower throughput before blocking a TFC yielding a higher throughput.

13. The UE of claim 7 wherein a media access control (MAC) entity in the UE notifies a codec of the blocked CCTrCH to reduce the data rate.

14. A method for dynamically selecting a transport format combination (TFC) for a user equipment (UE) which is configured to process a plurality of coded composite transport channels (CCTrCHs) simultaneously, the method comprising:
   (a) estimating transmit power of a TFC for each CCTrCH;
   (b) determining whether a total transmit power estimate for transmitting the CCTrCHs exceeds a maximum allowed transmit power of the UE; and
   (c) blocking at least one TFC if the total transmit power estimate exceeds the maximum allowed transmit power.

15. The method of claim 14 wherein in step (c) a TFC requiring a transmit power more than the maximum allowed transmit power is blocked.

16. The method of claim 14 wherein step (c) further comprises the step of determining a traffic class of each CCTrCH, whereby a TFC of a CCTrCH for non-real time (NRT) traffic is blocked before a TFC of a CCTrCH for real time (RT) traffic is blocked.

17. The method of claim 16 wherein a TFC requiring a higher transmit power is blocked before a TFC requiring a lower transmit power is blocked.

18. The method of claim 17 wherein a TFC causing a lower rate reduction is blocked before a TFC causing a higher rate reduction in a respective CCTrCH is blocked.

19. The method of claim 18 wherein a TFC yielding a lower throughput is blocked before a TFC yielding a higher throughput is blocked.

20. The method of claim 14 further comprising a step of media access control (MAC) entity in the UE notifies a codec of the blocked CCTrCH to reduce the data rate.

* * * * *

UNITED STATES PATENT AND TRADEMARK OFFICE
CERTIFICATE OF CORRECTION

PATENT NO. : 7,126,922 B2 Page 1 of 1
APPLICATION NO. : 11/141215
DATED : October 24, 2006
INVENTOR(S) : Guodong Zhang It is certified that error appears in the above-identified patent and that said Letters Patent is hereby corrected as shown below:

In claim 4, column 4, line 9, after the word "two", delete "CCTrCRs" and insert therefor --CCTrCHs--.

Signed and Sealed this

Tenth Day of April, 2007

JON W. DUDAS
*Director of the United States Patent and Trademark Office*